United States Patent [19]

Fleischer

[11] 3,903,231

[45] Sept. 2, 1975

[54] MODELS OF OBJECTS HAVING A SOFT AND IRREGULAR SURFACE STRUCTURE

[76] Inventor: Hjalmar Fleischer, Stora Bjorkby, 75590 Uppsala 1, Sweden

[22] Filed: Feb. 1, 1973

[21] Appl. No.: 328,794

Related U.S. Application Data

[63] Continuation-in-part of Ser. No. 65,658, Aug. 20, 1970, abandoned.

[30] Foreign Application Priority Data

July 13, 1970 Sweden.............................. 9701/70

[52] U.S. Cl. ................ 264/134; 264/154; 264/162; 264/219; 264/220
[51] Int. Cl. ............................................ B29c 1/02
[58] Field of Search .......... 264/219, 220, 225, 226, 264/134, 154, 162

[56] References Cited

UNITED STATES PATENTS

| | | | |
|---|---|---|---|
| 2,341,999 | 2/1944 | Lennington.......................... | 264/226 |
| 3,517,091 | 6/1970 | Ellman.............................. | 264/222 |

*Primary Examiner*—Robert F. White
*Assistant Examiner*—T. E. Balhoff
*Attorney, Agent, or Firm*—Fred Philpitt

[57] ABSTRACT

A method for producing models for making a mold by closely reproducing the exterior configuration of a bird or fur-bearing mammal having a soft and irregular surface which comprises immersing the bird or mammal in liquid wax until the liquid wax both surrounds, penetrates, and supports the feathers or irregular surface, solidifying the wax, and then removing the wax to a sufficient extent to expose an accurate exterior contour of the bird or mammal.

6 Claims, No Drawings

MODELS OF OBJECTS HAVING A SOFT AND IRREGULAR SURFACE STRUCTURE

RELATED APPLICATION

This application is a continuation-in-part of Application Ser. No. 65,658, filed Aug. 20, 1970 now abandoned, and since the present application is being filed during the pendency of Ser. No. 65,658 the benefits afforded by 35 USC 120 are claimed with respect to it.

BACKGROUND

For a long time there has been a substantial demand for reproductions of birds and mammals, both for artistic and educational purposes. It is usually desired that such reproductions be made of a durable material and be on a realistic (or natural) scale. Because of the soft and irregular surface structure of birds and fur-bearing animals, accurate and life-sized reproductions cannot be obtained by simply immersing the bird or fur-bearing mammal in a bath of molten plastic, solidifying the plastic, and using the solidified plastic as a mold. One reason is that the plastic (as well as other materials such as silicone rubber, sand and the like) penetrate between the feathers or into the fur, which makes separation therefrom virtually impossible. Another reason is that immersion in such liquid materials mashes down or "wets down" the feathers or fur so that any mold that is obtained would not accurately portray the true exterior contours of the bird or mammal.

THE PRESENT INVENTION

Considered from one aspect the present invention involves producing a model for use in making a mold by utilizing a method for producing the model which closely approaches reproducing the exterior configuration of an object such as a bird or a fur-bearing mammal that has an outer surface covering consisting of a myriad of small outwardly extending and easily movable surface elements that are separated from each other by void spaces, said method comprising:
a. applying to the outer surface of said bird or mammal a layer of a fixing agent so as to fix said movable surface elements in their natural position,
b. piercing said fixing layer at a plurality of points so as to thus provide a plurality of minute holes therethrough and thus bring said void spaces beneath said fixing layer into communication with the space outside said fixing layer,
c. applying to said fixing layer a release agent,
d. providing a bath of molten paraffin wax,
e. submerging the object treated according to steps (a)–(c) in said bath so that the object is completely covered,
f. maintaining said paraffin wax in a liquid condition until it has had a chance to both surround said object and penetrate through said plurality of minute holes and between the surface elements of said object so that the paraffin wax will thus substantially fill the void spaces between adjacent surface elements and thereby support said easily movable surface elements in substantially their natural position,
g. allowing said wax to solidify as a solid mass both around said object and within the void spaces between adjacent easily movable surface elements,
h. removing from said bath a solidified block of wax in which said object is completely embedded,
i. progressively removing increments of solidified wax from said block down as far as the release agent covered fixing layer,
k. producing a mold using the product resulting from step (i) as a model, and
l. reproducing as many molded objects as desired from the mold produced according to step (k).

The fixing agent of step (a) preferably comprises any well known type of hair spray composition that women use to "set" the exterior contour of their hair. These compositions are so well known that their composition need not be set forth here. The thickness of the fixing layer is not critical, the main consideration being that it is thick enough to resist substantial deformation of the object contours in step (e) and thin enough not to obscure or substantially distort the exterior contours of the object.

A dark lacquer may be lightly sprayed on the layer of fixing agent in order to give the object a dark color, which merely serves to produce a contrast color which is useful during the course of wax removal in step (i).

In step (c) the release agent that is sprayed on the fixing layer may be a silicone composition or any other suitable release agent which will facilitate removal of the exterior wax during step (i).

The bath of liquid paraffin wax is preferably contained in a vessel of transparent material, such as plastic or glass.

In step (i) the last increments or thin layers of the wax nearest the exterior contours of the object may be removed by means of a solvent in which the wax is soluble. This may decrease the amount of delicate manual wax removal work that is needed.

By treating an object according to steps (a) to (i) the surface contours of the object are rendered hard or rigidified to an extent which permits its use as a model in the production of a mold of a suitable material, without the mold halves adhering to the model during the mold production process.

For example, a well mounted bird can be sprayed with a fixing agent, such as a hair spray, until the plumage is fixed in place. Thereafter the object may be sprayed with a dark color lacquer in order to insure a good contrast to the eyes of the person who is to later remove the object from its embedment in a solid block of wax. Thereafter the thus obtained layer of hair spray (and possibly also lacquer) is pierced by making a plurality of minute holes therethrough and into the plumage in order to bring the void spaces between the easily movable plumage into communication with the space outside said layer.

The object thus treated is thereafter sprayed thoroughly with a release agent such as a silicone spray. Any other release agent which will facilitate removal of wax from the aforesaid layers may be used.

The object thus treated is then immersed in a vessel (which is preferably constructed of plastic or glass) containing liquid paraffin wax with a melting point of not more than 60°C. Even a water emulsifying paraffin wax can be used for heat sensitive objects, since the process does not require or produce heat. The liquid paraffin wax is maintained in a liquid condition until it has had a chance to both surround said object and penetrate through said plurality of minute holes and between the surface elements of the object so that the wax will substantially fill the void spaces between the surface elements and support the elements in their natural position. The quantity of wax is great enough so that even when the wax cools down or solidifies the object will be completely covered by wax. In other words, since wax shrinks when cooled, the quantity of wax must be sufficient so that all parts of the object remain covered during the solidification of the wax. When the wax is completely solid, enough heat is applied to the container so that the block of wax containing the object can be lifted out of the container. In most cases it is then possible to observe the details of the object through the block of wax. (As noted earlier, the application of a dark lacquer after step (a) will increase the contrast between the object and its surrounding wax.)

Initially large chunks of wax can be removed without risk of harming the object, using for instance a saw or large knife. Thereafter, further increments of the wax should be removed much more carefully and delicately, and with smaller tools, and this care continued until the surface of the object is closely approached. As the surface is closely approached, one may employ a sort of washing technique using a pair of tweezers and a cotton wool pellet that has been soaked in a suitable solvent, such as xylol.

The release agent that is present by virtue of step (c) above insures that the plumage contours can be exposed in substantially its original and natural condition, and with the minimum amount of effort in order to remove the last residues of the surface wax. There is thus no need to leave tool marks on the surface of the object. Under the fixing layer covered surface thus exposed, there still remains some wax (i.e. in the void spaces) said wax having penetrated through the plurality of pin holes established by step (b). This wax is not removed.

Finally, it is possible to use the object thus treated, and which has now acquired a hard exterior surface contour, as a model for the production of molds of plastic, silicone rubber, sand, or other material, said molds thereafter being used for casting the bird or mammal in glass, metal, plastic or any other desirable moldable material.

The finally cast model is thereafter preferably painted in life-like colors. The invention makes it possible to even make very natural models of objects such as an eagle owl, which has a very soft deep and fluffy plumage.

Of course, the present invention can be used for the production of full-scale models of other objects having a soft and irregular surface, such as textiles and the like.

By means of the present invention it is possible to make large quantities of life-like copies of objects which have previously not been reproduceable by casting.

Whereas my method has been described with reference to paraffin wax in step (d) it will be understood that other materials having comparable properties with respect to viscosity, solubility, and melting a solidification temperature may be used.

What is claimed is:

1. Producing a model for use in making a mold by utilizing a method for producing the model which closely approaches reproducing the exterior configuration of an object such as a bird or a fur-bearing mammal that has an outer surface covering consisting of a myriad of small outwardly extending and easily movable surface elements that are separated from each other by void spaces, said method comprising:
    a. applying to the outer surface of said object a layer of a fixing agent so as to fix or rigidify the movable surface elements in their natural position,
    b. piercing said fixing layer at a plurality of points so as to thus provide a plurality of minute holes therethrough and thus bring said void spaces beneath said fixing layer into communication with the space outside said fixing layer,
    c. applying to said fixing layer a release agent,
    d. providing a bath of liquid paraffin wax,
    e. submerging the object treated according to steps (a)–(c) in said bath so that the object is completely covered,
    f. maintaining said paraffin wax in a liquid condition until it has had a chance to both surround said object and penetrate through said plurality of minute holes and between the surface elements of said object so that the paraffin wax will thus substantially fill the void spaces between adjacent surface elements and thereby support said easily movable surface elements in substantially their natural position,
    g. allowing said wax to solidify as a solid mass both around said object and within the void spaces between adjacent easily movable surface elements,
    h. removing from said bath a solidified block of wax in which said object is completely embedded,
    i. progressively removing increments of solidified wax from said block down as far as the release agent covered fixing layer to expose a model which is useful for the production of molds.

2. The method according to claim 1, in which said fixing agent comprises a hair spray type of composition that is sprayed onto said outer surface contours of said object.

3. The method according to claim 2, in which a dark color is lightly spray lacquered onto the layer of hair spray.

4. The method according to claim 1, in which a silicone spray release agent is used as said release agent.

5. The method according to claim 1, in which the bath of liquid paraffin wax is contained in a vessel of transparent material.

6. The method according to claim 1, in which step (i) at least a thin layer of the wax nearest the exterior contours of the object is removed by means of a solvent in which the wax or the like material is soluble.

* * * * *